July 31, 1951 G. ICKES 2,562,720
WHEEL AND AXLE ASSEMBLY FOR VARIABLE TREAD VEHICLES
Filed Nov. 12, 1949
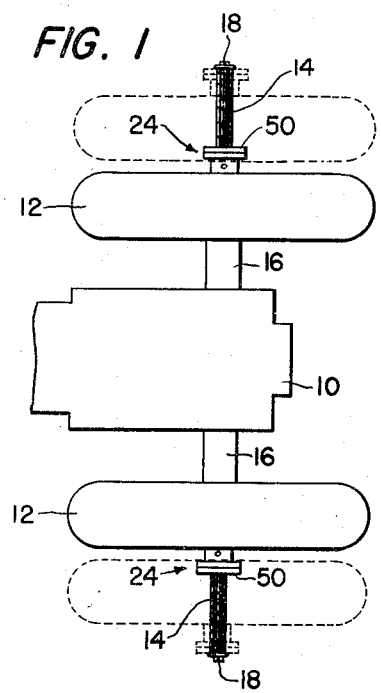
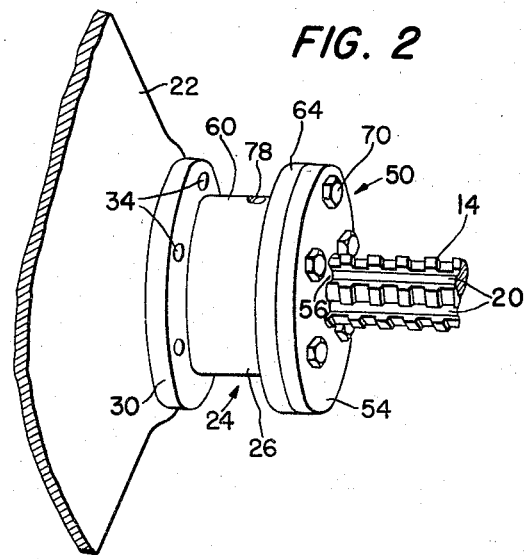
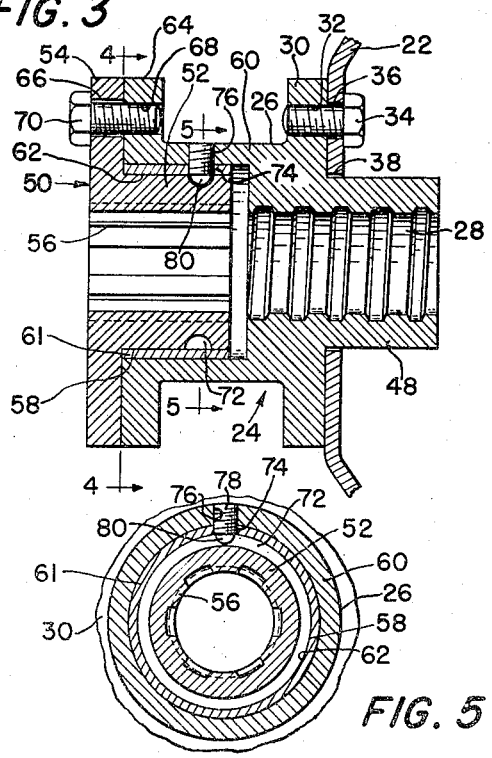
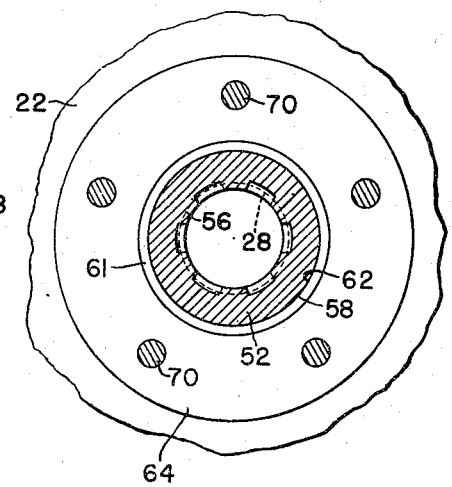
INVENTOR.
GEORGE ICKES
BY
ATTORNEY Patented July 31, 1951

2,562,720

UNITED STATES PATENT OFFICE 2,562,720

WHEEL AND AXLE ASSEMBLY FOR VARIABLE TREAD VEHICLES

George Ickes, Moline, Ill., assignor to Deere & Company, Moline, Ill., a corporation of Illinois Application November 12, 1949, Serial No. 126,787

9 Claims. (Cl. 301—128)

This invention relates to a wheel and axle assembly for use in agricultural tractors and like vehicles for the purpose of obtaining variation in lateral spacing or tread of the vehicle wheels.

The conventional agricultural tractor includes a longitudinal body from opposite sides of which project relatively long axles provided with keyways or splines. Traction wheels are mounted respectively on the splines and include hubs having portions cooperative with the splines to effect a driving connection between the axle and the wheel. Releasable or clamping means is included in the hub so that the wheels may be loosened on the axles and adjusted lengthwise of the axles, both wheels being so adjustable so that variation in lateral spacing or tread may be accomplished. In a further refined form of variable tread wheel and axle assembly, such as shown in the United States patent to Brown 2,099,194, the axles are externally threaded and the hubs are internally threaded so that the wheel and its related axle may be rotated relative to each other to effect axial adjustment of the wheel on the axle. Means is provided for normally clamping the wheel to the axle so that the two are constrained for rotation together during operation of the tractor with a selected tread. Variations in tread are important for the purpose of adapting the tractor to different farming operations. For example, in plowing, it is desired that the wheels be relatively closely spaced apart, whereas in cultivating it is desired that the wheels be relatively more widely spaced apart.

The present invention relates to an improvement in the general type of axle and wheel arrangement shown in the Brown patent identified above and has for its principal object improved means for securing the wheel to the axle, including releasable means whereby the wheel may be released from the axle for rotation relative thereto to effect axial adjustment. A further object of the invention resides in providing the releasable means in the form of a lock member having a bearing surface which journals or rotatably supports a portion of the wheel hub, thus relieving the threaded portion of the hub from a considerable portion of the load normally imposed thereon. A still further object of the invention is to provide an improved hub assembly that is simple in construction and inexpensive to manufacture, and one that may be readily used in the field to effect easy and rapid variation in tread or wheel spacing.

The foregoing and other important objects and desirable features inherent in and encompassed by the invention will become apparent to those versed in the art as a preferred embodiment of the invention is fully disclosed in the following detailed description and accompanying sheet of drawings, in which Figure 1 is a plan view of the rear portion of a tractor showing the wheels in full lines in a narrow tread position and showing the wheels in dotted lines in a wide tread position;

Figure 2 is an enlarged perspective view of the central portion of the wheel and the improved hub assembly;

Figure 3 is an enlarged sectional view of the hub assembly;

Figure 4 is a transverse sectional view taken substantially on the line 4—4 of Figure 3; and Figure 5 is a transverse sectional view taken on the line 5—5 of Figure 3.

The tractor chosen for the purposes of illustration comprises a longitudinal narrow body 10 carried on rear traction wheels 12 by means of axles 14 and opposite, laterally extending axle housings 16. Each axle 14 is elongated and has an outer end portion disposed at a point relatively remote from the proximate side of the tractor body. This outer end portion is provided with stop means 18 for the purpose of preventing inadvertent displacement of the wheel axially off the end of the axle. Each axle is externally threaded and is further provided with splines or keyways 20 running lengthwise thereof and intersecting the threads (Figure 2).

Each wheel comprises a central wheel body 22 which is dished or offset axially from the median plane of the wheel to provide for the mounting thereon of a hub assembly, designated generally by the numeral 24. The hub assembly comprises a hub body 26 having a central, internally threaded opening 28 by means of which the hub is mounted on the threaded axle 14. The hub body 26 includes a radial flange 30 provided with a circle of tapped bores 32 which receive a plurality of cap screws 34. These cap screws pass through a circle of bolt holes 36 arranged concentrically about a central opening 38 in the wheel body 22. The hub body has a cylindrical portion 48 projecting through the opening 38 to provide an annular shoulder for supporting the wheel body 22 at the marginal portions thereof surrounding the opening 38. The portions 30 and 48 of the hub provide means for carrying the wheel on the hub assembly.

The hub assembly thus far described mounts the wheel on the threaded axle 14 so that the wheel may be selectively rotated in opposite directions relative to the axle for the purpose of selectively propelling or adjusting the wheel axially relative to the axle. Since the arrangement is the same at both sides of the tractor, the wheels may be simultaneously or separately adjusted to accomplish various tread spacings. For example, in the use of the tractor in plowing, it may be desirable to set one wheel a little closer to the proximate side of the tractor than the spacing between the opposite wheel and the opposite side of the tractor.

Each hub assembly includes means for locking the hub, and consequently the wheel, in a selected fixed position on the axle. This means includes primarily a lock member, designated generally by the numeral 50, formed as a ring 52 integrally associated with a radial flange 54. The locking member 50 is internally splined at 56 to provide key means engageable with the keyways or splines provided in the axle 14. The outer cylindrical surface of the ring portion 52 provides a cylindrical bearing surface 58.

The hub includes an axial extension which provides an annular wall 60 provided with a bushing 61 that affords a cylindrical internal bearing surface 62 so that the hub is journaled or supported rotatably on the locking member 50, thus relieving the threaded portion 28 of the hub from the entire load imposed thereon. That portion of the axial extension 60 proximate to the flange 54 on the member 50 and remote from the flange 30 on the hub body 26 is provided with an integral radial flange 64. The flanges 54 and 64 thus constitute radial portions respectively on the member 50 and hub body 26 for the purpose of accommodating means for releasably securing the member 50 and hub together for joint rotation. Since the member 50 is constrained by its splined connection with the axle for rotation with the axle, the member likewise constrains the wheel for rotation with the axle. The radial flange 54 is provided with a circle of bolt holes 66 and the flange 64 is provided with a registering circle of tapped bores 68. A plurality of cap screws 70 are passed through the holes 66 and are threaded into the tapped bores 68 for completing the securing means between the member 50 and the hub 24.

It is an important feature of the invention to provide means for releasably interconnecting the member 50 and hub 24 for axial movement together on the axle while permitting relative rotation between the member and hub. This means preferably takes the form of an annular groove 72 formed in the cylindrical surface 58 of the ring portion 52 of the member 50. This groove opens outwardly through a radially registering opening 74 in the bushing 61 in the extension 60. This opening in turn is in radial register with a tapped bore or opening 76 in the annular wall of the extension 60. A connecting member in the form of a threaded screw 78 is received by the tapped bore 76 and passes through the opening 74 in the bushing. The connecting member is provided with a rounded nose 80 angularly slidably received by the groove 72. The threaded member 78 may be in the form of a set screw having a slotted or hexagonally recessed head, no details of which are illustrated.

The wheel 12 is fixed to the respective axle 14 when the hub assembly is as constituted in Figure 3. In this arrangement, the locking member 50 is splined to the axle and is connected by the flanges 54 and 64 and the cap screws 70 to the hub body 26. The tractor may now be normally operated, power transmitted from the engine (not shown) being transmitted through the axles and thence to the traction wheels 12. When it is desired to vary the tread or lateral spacing between the wheels, it is necessary merely to remove the cap screws 70. This operation frees the wheels for rotation relative to both the axle and the locking member 50. The tractor may be jacked up and the wheel rotated manually, or power may be transmitted to the axle through the usual transmission and differential mechanism of the tractor. As the wheel moves axially along its axle, it will carry with it its associated locking member, by virtue of the connection established at 78—80—72. This result will obtain regardless of which direction axially the wheel moves. After a selected position of the wheel has been obtained, it may be secured by replacing the cap screws 70. There is no need to remove the connecting screw 78 unless it is desired to disconnect the locking member 50 completely from the hub assembly.

Various features and objects of the invention not specifically enumerated herein will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. A wheel and axle assembly for use in obtaining wheel tread variation in agricultural tractors and like vehicles, comprising: an elongated, externally threaded axle provided with a keyway running lengthwise thereof and intersecting the threads; a wheel on the axle, including a hub having a hub body provided with a central, internally threaded opening fitting the threaded axle so that the relative rotation of the wheel and axle selectively in opposite directions simultaneously effects relative axial adjustment thereof respectively in opposite directions lengthwise of the axle, a coaxial extension rigid on the hub body and having an annular wall providing an internal cylindrical bearing surface of larger diameter than the axle; a lock member having a central aperture for receiving the axle adjacent the hub extension and having internal key means engageable with the axle keyway, said member further having an external cylindrical bearing surface telescoped into the hub extension and journaling said hub extension via said internal bearing surface; means selectively cooperative between the lock member and the hub for rigidly though releasably securing the lock member to the hub for rotation of the two together or, alternatively, for rotation of the wheel and hub relative to the lock member; and means interconnecting the hub and lock member and constraining the two for axial movement together in either direction lengthwise of and relative to the axle when the wheel is rotated relative to the axle after said releasable means is released.

2. The invention defined in claim 1, further characterized in that: the releasable means includes radially disposed portions on the hub extension at the end of said extension remote from the hub body, cooperating radial portions on the lock member, and means releasably securing the extension portions to the member portions.

3. The invention defined in claim 1, further characterized in that: the releasable means includes a radial flange on the hub extension at the end thereof remote from the hub body and having a circle of bolt holes therein, a cooperating radial flange on the lock member having a registering circle of bolt holes therein, and a plurality of bolts receivable by and removable from the bolt holes of said flanges.

4. The invention defined in claim 1, further characterized in that: the interconnecting means includes an annular groove in the external cylindrical bearing surface of the lock member, means including a radial opening in the annular wall of the hub extension in radial alinement with the groove, and a connecting member fixed in said radial opening and projecting radially inwardly into and angularly slidably received in the groove.

5. A wheel and axle assembly for use in obtaining wheel tread variation in agricultural tractors and like vehicles, comprising: an elongated, externally threaded axle provided with a keyway running lengthwise thereof and intersecting the threads; a wheel on the axle, including a hub having a hub body provided with a central, internally threaded opening fitting the threaded axle so that the relative rotation of the wheel and axle selectively in opposite directions simultaneously effects relative axial adjustment thereof respectively in opposite directions lengthwise of the axle, a coaxial element rigid on and projecting from the hub body and of hollow form to loosely surround that portion of the axle adjacent the hub body, said element including means providing a coaxial bearing axially spaced from the hub body; a lock member having a central aperture for receiving the axle adjacent the hub extension and having internal key means engageable with the axle keyway, said member further having means providing a coaxial bearing thereon cooperative with the element bearing means to support and journal the hub in axially spaced relation to the hub body; means selectively cooperative between the lock member and the hub for rigidly though releasably securing the lock member to the hub for rotation of the two together or, alternatively, for rotation of the wheel and hub relative to the lock member; and means interconnecting the hub and lock member and constraining the two for axial movement together in either direction lengthwise of and relative to the axle when the wheel is rotated relative to the axle after said releaseable means is released.

6. For use in an agricultural tractor or like vehicle having a longitudinal body and a transversely extending, elongated, externally threaded axle provided with a keyway running lengthwise thereof and intersecting the threads: a hub assembly for mounting a wheel on the axle for axial adjustment relative to the axle, comprising a hub having a hub body provided with external means for carrying such wheel and provided further with an internally threaded opening to receive the threaded axle so that relative rotation of the hub and axle selectively in opposite directions simultaneously effects axial adjustment of the hub respectively in opposite directions lengthwise of and relative to the axle; a coaxial extension rigid on the hub body and having an annular wall providing an internal cylindrical bearing surface of larger diameter than the axle; a lock member having a central aperture for receiving the axle adjacent the hub extension and having internal key means engageable with the axle keyway, said member further having an external cylindrical bearing surface telescoped into the hub extension and journaling said hub extension via said internal bearing surface; means selectively cooperative between the lock member and the hub for rigidly though releasably securing the lock member to the hub for rotation of the two together or, alternatively, for rotation of the wheel and hub relative to the lock member; and means interconnecting the hub and lock member and constraining the two for axial movement together in either direction lengthwise of and relative to the axle when the wheel is rotated relative to the axle after said releasable means is released.

7. The invention defined in claim 6, further characterized in that: the releasable means includes a radial flange on the hub extension at the end thereof remote from the hub body and having a circle of bolt holes therein, a cooperating radial flange on the lock member having a registering circle of bolt holes therein, and a plurality of bolts receivable by and removable from the bolt holes of said flanges.

8. The invention defined in claim 6, further characterized in that: the interconnecting means includes an annular groove in the external cylindrical bearing surface of the lock member, means including a radial opening in the annular wall of the hub extension in radial alinement with the groove, and a connecting member fixed in said radial opening and projecting radially inwardly into and angularly slidably received in the groove.

9. For use in an agricultural tractor or like vehicle having a longitudinal body and a transversely extending, elongated, externally threaded axle provided with a keyway running lengthwise thereof and intersecting the threads; a hub assembly for mounting a wheel on the axle for axial adjustment relative to the axle, comprising a hub having a hub body provided with external means for carrying such wheel and provided further with an internally threaded opening to receive the threaded axle so that relative rotation of the hub and axle selectively in opposite directions simultaneously effects axial adjustment of the hub respectively in opposite directions lengthwise of and relative to the axle; a coaxial element rigid on and projecting from the hub body and of hollow form to loosely surround that portion of the axle adjacent the hub body, said element including means providing a coaxial bearing axially spaced from the hub body; a lock member having a central aperture for receiving the axle adjacent the hub extension and having internal key means engageable with the axle keyway, said member further having means providing a coaxial bearing thereon cooperative with the element bearing means to support and journal the hub in axially spaced relation to the hub body; means selectively cooperative between the lock member and the hub for rigidly though releasably securing the lock member to the hub for rotation of the two together or, alternatively, for rotation of the wheel and hub relative to the lock member; and means interconnecting the hub and lock member and constraining the two for axial movement together in either direction lengthwise of and relative to the axle when the wheel is rotated relative to the axle after said releasable means is released.

GEORGE ICKES.

REFERENCES CITED

The following references are of record in the file of this patent:

UNITED STATES PATENTS

| Number | Name | Date |
| --- | --- | --- |
| 2,235,457 | Lorimor | Mar. 18, 1941 |
| 2,324,681 | Dekker | June 20, 1943 |
| 2,472,742 | Brown | June 7, 1949 |